United States Patent

Payne

[11] Patent Number: 5,797,709
[45] Date of Patent: Aug. 25, 1998

[54] DRILLS

[76] Inventor: David Patrick Payne, 30 Park Road, Berrylands, Surbiton, Surrey KT5 8QD, United Kingdom

[21] Appl. No.: 589,740

[22] Filed: Jan. 22, 1996

[30] Foreign Application Priority Data

Jan. 23, 1995 [GB] United Kingdom ............... 9501257

[51] Int. Cl.[6] ............................................. B23B 29/034
[52] U.S. Cl. ........................ 408/159; 408/180; 408/224; 82/1.2
[58] Field of Search ........................ 82/1.2, 1.5; 408/56, 408/57, 153, 159, 157, 158, 180, 224

[56] References Cited

U.S. PATENT DOCUMENTS

| 1,331,138 | 2/1920 | Baldwin | 408/172 |
|---|---|---|---|
| 1,645,602 | 10/1927 | Lewis | 82/1.5 |
| 2,236,944 | 4/1941 | Gerardi | 255/74 |
| 2,401,074 | 5/1946 | Huelster | 82/1.5 |
| 4,307,636 | 12/1981 | Lacey | 408/159 X |
| 4,411,324 | 10/1983 | Liebig | 408/159 X |
| 4,992,010 | 2/1991 | Fischer | 408/159 |
| 4,998,981 | 3/1991 | Miyanaga | 175/286 |

FOREIGN PATENT DOCUMENTS

| 1184106 | 3/1970 | United Kingdom | 82/159 |
|---|---|---|---|
| 2157207 | 10/1985 | United Kingdom | 82/1.5 |
| 2 184 962 | 7/1987 | United Kingdom . | |
| 2 246 089 | 1/1992 | United Kingdom . | |

*Primary Examiner*—Daniel W. Howell
*Assistant Examiner*—Henry W. H. Tsai
*Attorney, Agent, or Firm*—Kinney & Lange, P.A.

[57] ABSTRACT

An expansible drill is provided for drilling and undercutting holes. The drill comprises a rotatable tubular drill body having a drill head at one end for cutting a bore. At least one undercutting arm is located within a slot in the drill body and attached by a hinge such that at least a part of the arm is pivotal radially outwards. A guide is provided for moving the arm radially outwards, the guide comprising a shaft which is located within the drill body and constrained to rotate therewith. A locking mechanism selectively prevents or allows the shaft to move axially relative to the drill body as force is applied to an end of the shaft.

15 Claims, 3 Drawing Sheets

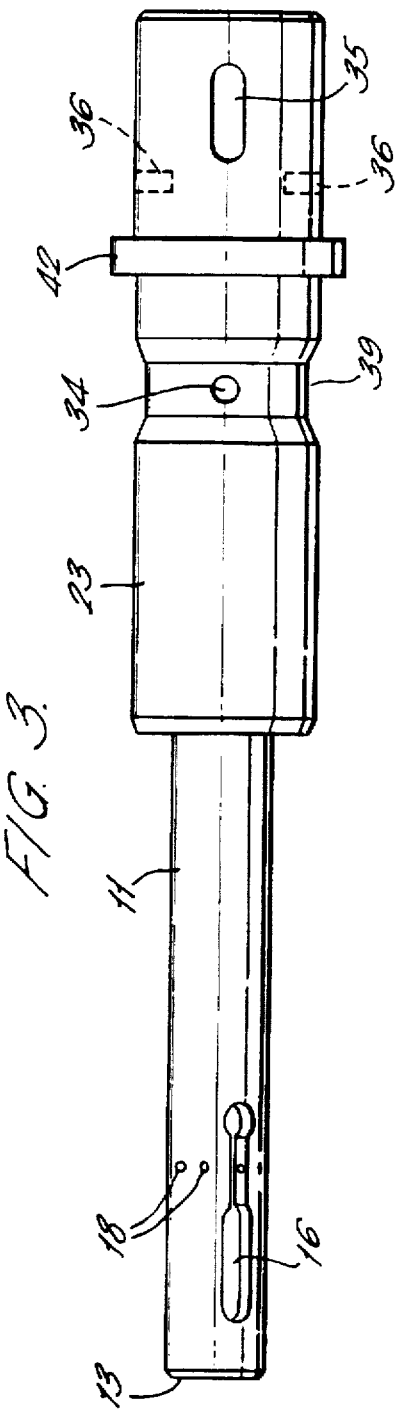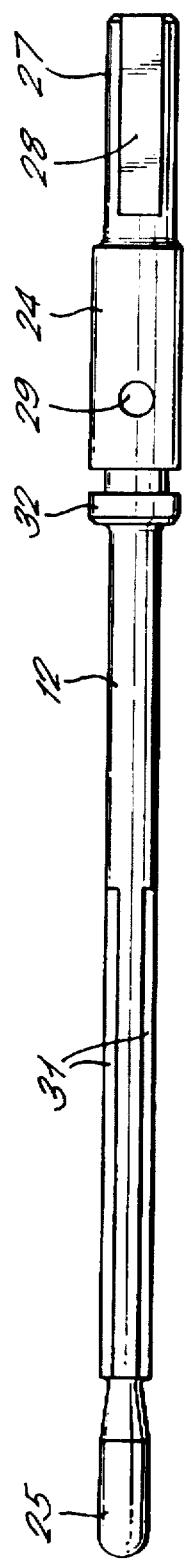

DRILLS

The invention relates to improvements in drills for drilling and undercutting holes.

Many building components, such as walls, roofs etc., are required to support some form of fixing, such as a bolt or an anchor. Many such fixings used nowadays have an expanding sleeve or skirt which, once the fixing is inserted into a bore in the building component, is then expanded. Expanding fixings are advantageous in that they provide an increase in the bearing strength of the fixing for a smaller contact area. Thus the fixing may be more securely fixed or a shorter fixing and shallower hole may be used.

The main disadvantage of such fixings lies in that there is only a small area of actual contact between the fixing and the walls of the bore in which it is affixed.

Some drills are now available which are capable of forming an undercut or cavity within the bore below the surface of the component. When a fixing is expanded in an undercut bore, there is a far greater area of contact between the fixing and the walls of the bore and it is far more secure.

Applicant's patent specification GB-A-2184962 describes an expansible drill for forming an undercut. The drill disclosed in this document comprises a cylinder having an incorporated cutting edge at one end. The end of the cylinder is slotted and can be expanded by tightening a nut on the end of the central shaft sticking out of the bore. This forces a frusto-conical wedge inside the slotted end of the cylinder causing it to expand radially.

The problem with this drill is that, whilst it functions extremely well, it is expensive to produce.

The patent specification of GB-A-2157207 also discloses an undercutting drill. The blades carrying the cutting teeth of this drill are flexible and are forced to expand radially as the body of the drill is forced over the conical guide. The latter is effected by pushing the drill against the bottom of the bore so that the guide, which is movable axially relative to the drill body, can move no further and the blades thus slide over the guide sides and consequently are expanded. Alternatively, a collar is described which bears on the outer surface of the material having the bore. The collar is fixed to the lower half of the drill body, whilst the upper half is movable relative thereto in an axial direction.

The retraction of this drill relies on the recovery of the blades which have been forced to expand. If this does not happen, perhaps due to fatigue or excessive friction, the drill would be useless. Additionally the bore would probably be damaged whilst trying to extract the useless drill. It has been found that the drill is also difficult to use because of the force required to expand the blades. The friction caused by the blades moving over the cruciform guide is quite substantial and prevents ease of use. Also the length of the drill required to ensure that the upper and lower parts of the drill body are movable relative to each other made the drill cumbersome and difficult to use.

U.S. Pat. No. 2,236,944 discloses a drill bit for drilling inverted counterbore holes. This drill has a rotating drill body with radially extending arms attached at one end. A shaft, which is constrained to rotate with the drill body, is movable longitudinally relative to the drill body and has a ball-head which causes the arms to extend outwardly when it comes into contact therewith. Movement of the shaft is effected by an external handle which, when moved, causes a rotating collar to move against a spring positioned between a stepped portion of the drill body and the collar. The obvious disadvantage with this arrangement is that dust and debris from the drilling operation will effect the movement of the spring, the rotating collar and the handle thereby causing it to jam.

Applicant's patent specification GB-A-2246089 discloses a drill for forming an undercut in a cylindrical bore which overcomes the disadvantages listed above. This drill incorporates a trigger which can be squeezed towards a handle to move a non-rotating shaft axially relative to the drill body rotating within the bore. A collar mounted on the shaft travels along in contact with the inner surface of cutting arms which pivot out from recesses within the drill body thereby expanding the drill to cut a conical shaped undercut. When the drill is to be withdrawn from the bore, the trigger is pulled away from the handle which retracts the shaft and allows the arms to pivot inwards to their original position. The trigger provides a high degree of control and accuracy in expanding the drill.

The main disadvantage with all of the prior art drills, however, is that the drilling of the bore and subsequent undercutting requires separate apparatus for each part of the process.

It is therefore an object of the present invention to provide an improved drill which can easily be used for both forming a bore and subsequently undercutting it.

According to the present invention there is provided an expansible drill for drilling and/or undercutting holes comprising a rotatable tubular drill body having bore cutting means at one end of the drill body, at least one radially extending arm attached by hinge means adjacent a cutting end of the drill body such that at least a part of the arm is pivotal radially outwards, cutting means formed in the arm, guide means for moving the arm radially outwards, said guide means comprising a shaft one end of which is in contact with the arm or arms, the drill further comprising means for selectively allowing the shaft to move axially relative to the drill body or to be held relative thereto.

A preferred embodiment of the present invention will now be described, by way of example only, with reference to the accompanying drawings in which:

FIG. 3 is a side elevation of a drill body of the drill of FIG. 1; and

FIG. 4 is a side elevation of a push rod of the drill of FIG. 1.

Figure 1:
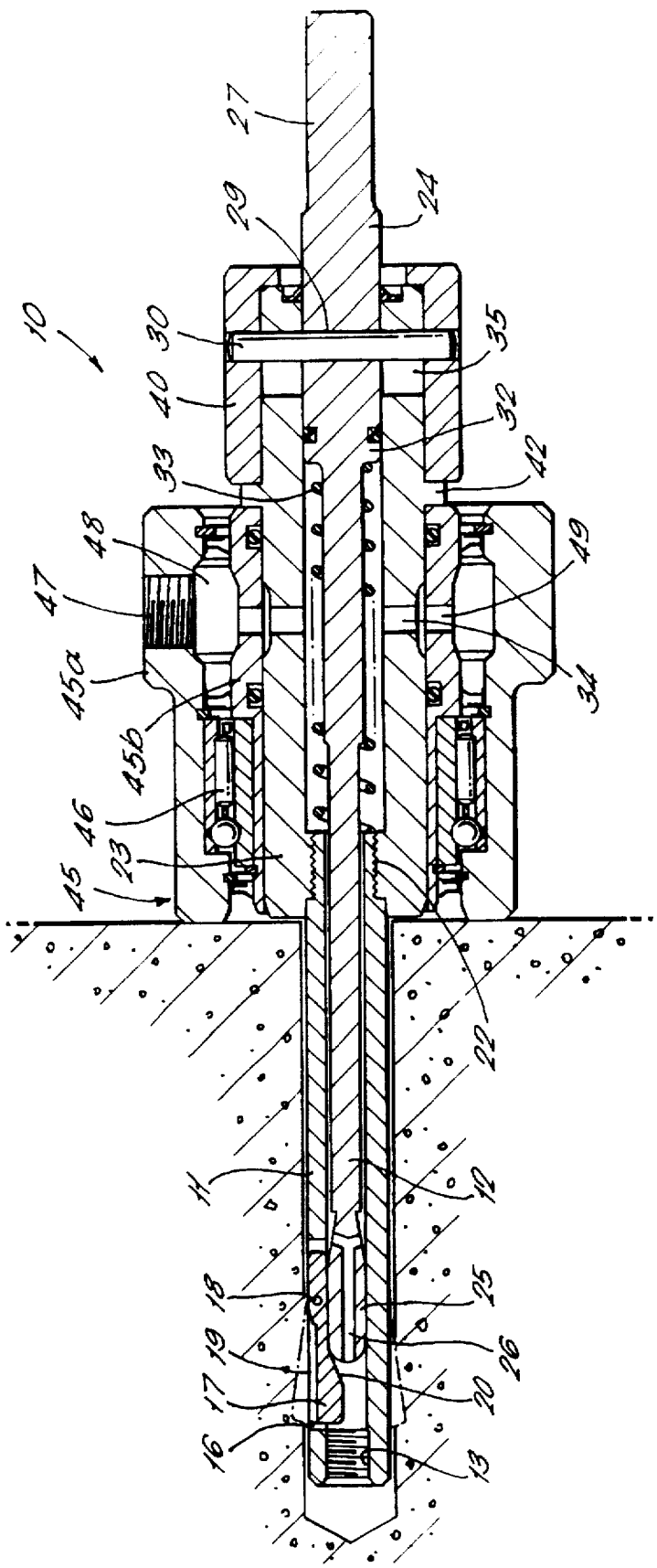
FIG. 1 is a side sectional elevation of a drill according to the invention on the line I—I of FIG. 2 shown in situ.
Figure 2:
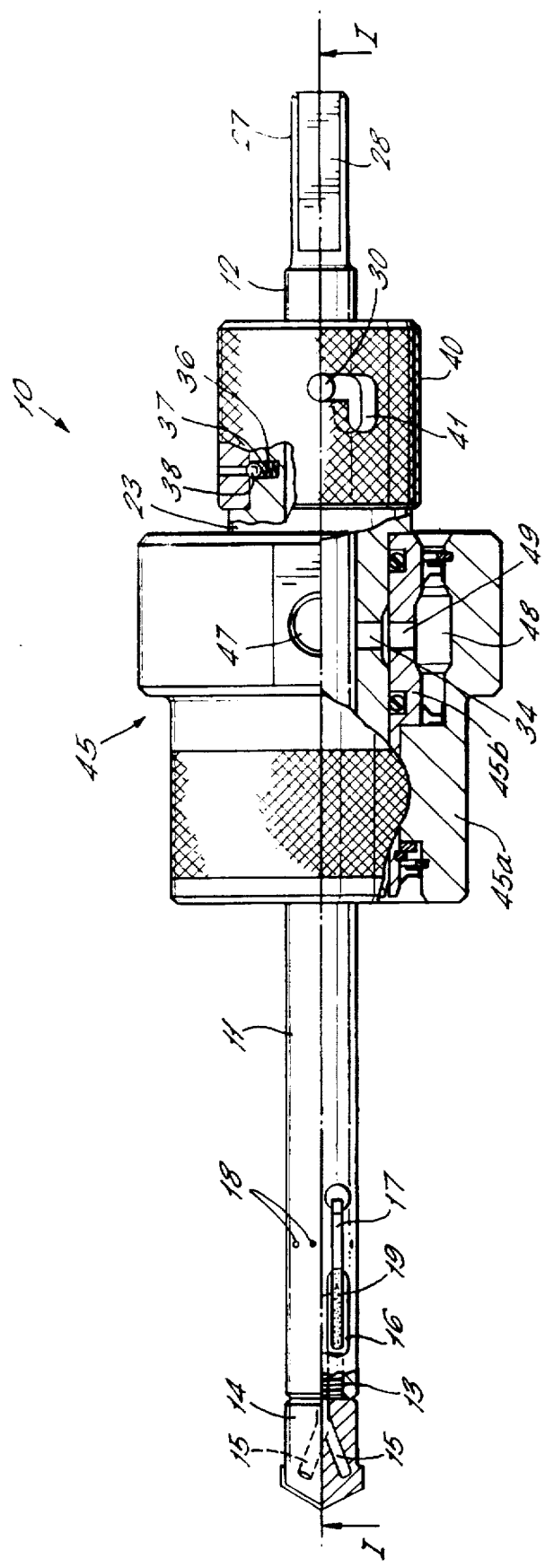
FIG. 2 is a side elevation of the drill of FIG. 1 of which some parts are shown in section.

Referring to FIGS. 1 and 2, the drill 10 comprises a hollow rotatable drill body 11. The drill body 11 has an internal thread 13 at one end to receive a drill head 14 having a complimentary external thread. This will be referred to as the "cutting end" of the drill body 11 and the opposite end will be referred to as the "non-cutting end". Having a removable drill head 14 means that different heads can be used for drilling different materials and worn out heads can more cheaply be replaced. The drill head 14 preferably has at least one passage way 15 drilled through it.

The drill body 11 has one or more axial slots 16 formed towards its cutting end as shown in FIG. 3.

Positioned within each slot 16, and hinged to the drill body 11, is an arm 17. The hinge can be of any suitable form which allows a major part of the arm 17 to pivot outwards. The hinge shown in the drawings comprises a hole 18 drilled through the drill body 11 on either side of the slot and through each arm 17. A pin is then pushed through the holes 18 to hold the arm 17 in place. The hinge allows one end of the arm 17 to swing out radially in an arc to form the undercut and the other end of the arm 17 swings inwards.

The outer surface of each arm 17 has a cutting edge or surface 19 formed, for example, with cutting teeth or impregnated with industrial diamond. The cutting surface 19 preferably extends along the major part of the arm 17 which pivots radially outwards. In a preferred embodiment of the invention, the drill 10 has three arms 17 equally spaced about the circumference of the drill body 11, although the invention is not limited to this number. The inner surface of each arm 17 curves inwardly so as to form a cam surface 20 towards the cutting end of the arm 17.

The drill body 11 has, at its non-cutting end, an external thread 22 which enables it to be screwed into a sleeve 23 having a complimentary internal thread at one end.

The drill 10 also comprises a push rod 12 which extends through the drill body 11 and sleeve 23. The drill body 11 receives a front end of the push rod 12, whilst the sleeve 23 surrounds a middle portion of the push rod 12.

Referring to FIG. 4, the push rod 12 has, at its front end, a bulb-like tip 25 which is rounded and narrows to form a neck where it is attached to the push rod 12. This neck receives the parts of the arms 17 which swing inwards during undercutting. Drilled through the tip 25 is a passage way 26 which is preferably Y-shaped extending axially and separating to form a pair of transverse branches through the sides of the neck, as shown in FIG. 1. This passage way 26 permits the flow of water through the tip 25 into the bore.

The rear end 27 of the push rod 12 which projects from the sleeve 23 is shaped for attachment to driving means, such as a power drill. This can be in the form of one or more flattened surfaces 28. The surface of the push rod 12 located within the drill body 11, adjacent the tip 25, also has one or more flattened surfaces to allow the passage of water along the push rod 12 to the tip 25.

Located along the middle portion of the push rod 12 is a flange 32 and a section 24 of greater diameter than the rest of the rod 12. An aperture 29 is drilled through the section 24. When the sleeve 23 is positioned about the push rod 12, a pin 30 is placed through the aperture 29 and a slot 35 in the sleeve 23.

Before the push rod 12 is inserted in the sleeve 23, a compression spring 33 is located around the middle portion of the push rod 12, so that it will lie within the bore of the sleeve 23. One end of the spring 33 abuts against the drill body 11 where it is screwed into the sleeve 23 and the other end against the flange 32. The spring 33 is biased so that when it is in its resting position, the tip of push rod 12 lies behind the projections 20 on the back of the arms 17 and they lie within the slots 16.

The sleeve 23 has a region 39 of reduced diameter, in which is located a transverse hole 34. This forms part of the water passage way, which is described in full below. The sleeve 23 also has a locating flange 42.

Mounted on the rear end of the sleeve 23, abutting the locating flange 42, is a collar 40 which has, on each side, an L-shaped aperture 41. The pin 30 which passes through the push rod 12 and the sleeve 23, also passes through the apertures 41 in the collar. The collar 40 is rotatable and axially slidable relative to the sleeve 23, but its movement is limited by movement of the pin 30 within the L-shaped aperture 41.

Catch means are provided in the form of a pair of holes 36 drilled part way into opposite sides of the sleeve 23, each of which receives a spring 37 and ball bearing 38 which bear against the collar 40. The inner surface of the collar 40 has a pair of detents to receive the ball bearings 38, when the collar 40 is in its bore drilling position. The catch means help to hold the collar 40 in that position.

Also mounted on the sleeve 23, abutting against an opposite side of the flange 42 to the collar 40, is a thrust bearing housing 45.

The housing 45 comprises an outer part 45a and an inner part 45b. The housing inner part 45b is directly mounted on the sleeve 23. The fit is such that there is no relative movement therebetween. Sandwiched between the housing parts 45a, 45b is a thrust bearing 46. The bearing 46 allows the housing outer part 45a to remain stationary, whilst the sleeve 23 and housing inner part 45b rotate relative thereto. The housing outer part 45a has a single aperture 47 to receive a water supply. The aperture 47 leads into a chamber 48 between the housing parts 45a, 45b. Leading from the chamber 48 through the housing inner part 45b are a series of holes 49 which are located in the vicinity of the neck 39 in the sleeve 23. The two parts of the housing 45a, 45b are sealed at each end with appropriate fluid/gas-type seals.

In use, the drill 10 is first set to drill a cylindrical bore. To achieve this, the collar 40 is twisted so that the pin 30 is in the position in the L-shaped slots 41 shown in FIG. 2. The catch means help to hold the collar 40 in this position whereby the pin 30 is restrained at the extreme right-hand end of the slot 35 in sleeve 23. This set up permits no relative axial movement between the push rod 12 and the drill body 11/sleeve 23. The driving end 27 of the push rod 12 is connected to driving means which drive the push rod 12. The pin 30 also constrains the sleeve 23/drill body 11 and collar 40 to rotate with the push rod 12. The thrust bearing 46, however, allows the housing 45 to be held stationary. The drill head 14 is placed against the component to be drilled and the drill 10 is pushed into the component until the housing 45 abuts against it.

Once this stage is achieved, the collar 40 is rotated until the pin 30 is at the apex of the L-shaped aperture 41. This allows the pin 30 to move along the longitudinal slots 35 in the sleeve 23 when force is applied to the end of the drill 10. This force causes the push rod 12 to move axially within the sleeve 23, thereby compressing the spring 33. As the push rod 12 moves, the push rod tip 25 travels along in contact with the cam surfaces 20 of the arms 17 such that the cutting ends of the arms 17 are forced outwards whilst the outer ends of the arms 17 swing into the neck behind the tip 25. This causes expansion of the drill 10 to cut a conical shape undercut.

In one embodiment of the invention, whilst drilling, water is supplied through aperture 47 in the outer housing part 45a. This passes into the chamber 48, through the holes 49 in the inner housing part 45b, through the hole 34 in the sleeve 23 and into the gap between the sleeve 23 and the push rod 12. The flattened surfaces 31 of the push rod 12 allow the water to travel along the sides of the push rod 12 into the necked region of the push rod tip 25. The water then passes into the passageway 26 and out through the passage ways 15 in the drill head 14. This flow of water assists in cooling the parts of the drill 10 which may be heated during drilling due to friction and helps to wash away debris caused by drilling. In some embodiments of the invention the water supply may be replaced by a supply of other fluid, such as coolant, or a gas. Alternatively, a vacuum may be applied to extract dust and debris from the drilling cavity and to cause a cooling flow of air flowing in the opposite direction to the one previously described.

Once the drilling operation is completed, the relaxation of pressure on the end of the drill 10 allows the spring 33 to expand and push the push rod 12 rearwardly. The push rod tip 25 moves back out of contact with the arm cam surfaces 20. As the push rod 12 moves backwards, the ends of the arms 17 which are positioned in the neck behind the tip 25 are forced back out, thereby causing the arms 17 to be pulled back within the slots 16.

Although the drill body 11 is shown as being a smooth cylinder, it may be fluted to assist the flow of debris away from the bore during drilling. It should also be noted that the drill body 11 can be replaced easily so that different sizes can be used for different size holes.

As mentioned previously, the hinge arrangement associated with the arms 17 can be replaced by any other suitable arrangement. Another possibility would be to use an O ring located within a groove in the drill body 11. This would enable the arms to easily be changed in the event that the cutting edge is blunted.

The cutting surface 19 may be integrally formed in the arm 17. Alternatively, disposable tips may be applied.

The arrangement of the drill 10 is such that as well as plane rotating drilling means, hammer drill action can also be used.

The parts of the drill may be made from any appropriate material. Especially preferred are stainless steel and bronze to avoid any corrosion due to the flow of water or other liquid in and around the drill 10.

Although the drill can be used for both drilling the bore and undercutting, it can quite clearly also be used as just for one operation or the other.

I claim:

1. An expansible drill for drilling and undercutting holes comprising a rotatable tubular drill body having bore cutting means at one end thereof, at least one undercutting arm located within a slot in the drill body attached by hinge means such that at least a part of the arm is pivotal radially outwards, guide means for moving the arm radially outwards, said guide means comprising a shaft which is located within the drill body and constrained to rotate therewith, the drill further comprising locking means for selectively preventing or allowing the shaft to move axially relative to the drill body as force is applied to an end of the shaft.

2. An expansible drill as claimed in claim 1 in which there are three arms disposed within slots cut axially in an end of the drill body.

3. An expansible drill as claimed in claim 1 in which an inner surface of the arms or arms and the guide means are profiled such that axial movement of the shaft relative to the drill body in one direction causes the arm or arms to pivot radially outwards.

4. An expansible drill as claimed in claim 3 in which the guide means is further profiled such that axial movement of the shaft relative the drill body in an opposite direction causes the arm or arms to pivot inwards.

5. An expansible drill as claimed in claim 1 in which the guide means is connected to drive means.

6. An expansible drill as claimed in claim 1 in which the locking means comprises a collar rotatable between a locked position, in which the shaft is prevented from moving axially relative to the drill body, and an unlocked position in which the shaft is permitted to move axially relative to the drill body.

7. An expansible drill as claimed in claim 6 in which the locking means further comprise a locking pin which passes transversely through the guide means, through axial slots in the drill body and through slots in the collar.

8. An expansible drill as claimed in claim 7 in which the slots in the collar are L-shaped, having a transverse component and an axial component.

9. An expansible drill as claimed in claim 1 further comprising spring means located so as to hold the guide means in a position so that the arm or arms remain in their slots.

10. An expansible drill as claimed in claim 1 further comprising a housing containing a thrust bearing.

11. An expansible drill as claimed in claim 10 in which the housing comprises an inner part and an outer part, located between which is said bearing.

12. An expansible drill as claimed in claim 11 in which the inner part of the housing is located on the drill body.

13. An expansible drill as claimed in claim 1 in which the drill body comprises two sections, a drilling end and a sleeve.

14. An expansible drill as claimed in claim 1 in which the bore cutting means are detachable from the drill body.

15. An expansible drill as claimed in claim 10 in which components of the drill have apertures and passageways to enable a fluid or gas to be supplied through the housing to the cutting end of the drill body.

* * * * *